United States Patent [19]
Melchiorri Santolini et al.

[11] Patent Number: 4,721,585
[45] Date of Patent: Jan. 26, 1988

[54] PROCESS FOR THE BIOLOGICAL TREATMENT OF SEWAGE

[75] Inventors: Ulderico Melchiorri Santolini, Arizzano; Roberto Antonietti, Parma; Pierluigi Viaroli, Fiorenzuola d'Arda; Caterina Della Sala Merigo, Verbania Pallanza; Gianpaola Malara, Omegna; Mario Contesini, Verbania Trobaso, all of Italy

[73] Assignees: Consiglio Nazionale Delle Richerche; Universita Degli Studi Di Parma, both of Italy

[21] Appl. No.: 912,248
[22] PCT Filed: Jan. 24, 1986
[86] PCT No.: PCT/IT86/00006
§ 371 Date: Sep. 11, 1986
§ 102(e) Date: Sep. 11, 1986
[87] PCT Pub. No.: WO86/04321
PCT Pub. Date: Jul. 13, 1986

[30] Foreign Application Priority Data

Jan. 25, 1985 [IT] Italy ................. 40008 A/85

[51] Int. Cl.⁴ ..................... C02F 3/08; C02F 3/34
[52] U.S. Cl. ............................ 210/616; 210/631; 210/903; 210/906; 435/262; 71/9; 71/12
[58] Field of Search ............. 210/605, 610, 611, 603, 210/616, 620, 630, 903, 631, 906; 71/10, 12, 14, 15, 9, 23-25; 435/252, 262

[56] References Cited

U.S. PATENT DOCUMENTS

| | | | |
|---|---|---|---|
| 3,933,627 | 1/1976 | Fusey | 210/610 |
| 4,039,438 | 8/1977 | Anderson | 210/610 |
| 4,461,708 | 7/1984 | Hakulinen et al. | 210/605 |
| 4,494,975 | 1/1985 | De Boodt et al. | 210/605 |
| 4,510,243 | 4/1985 | Haga et al. | 210/605 |
| 4,597,872 | 7/1986 | Andersson et al. | 210/603 |

FOREIGN PATENT DOCUMENTS

| | | | |
|---|---|---|---|
| 216706 | 12/1984 | Fed. Rep. of Germany | 210/616 |
| 2476629 | 8/1981 | France | 210/903 |
| 53-98305 | 8/1978 | Japan | 210/611 |
| 58-74186 | 5/1983 | Japan | 210/616 |

*Primary Examiner*—Benoit Castel
*Attorney, Agent, or Firm*—Darby & Darby

[57] ABSTRACT

A process is disclosed for the biological treatment of sewage, which envisages the use of raw cellulosic materials brought into contact with the fouled water in the presence of cellulose-devouring micro-organisms, and is centered particularly on separation of the sewage's nitrogen and phosphorus content.

6 Claims, No Drawings

PROCESS FOR THE BIOLOGICAL TREATMENT OF SEWAGE

BACKGROUND OF THE INVENTION

A process is disclosed for purification of sewage by biological means.

A significant problem connected with sewage disposal is that the sewage contains dissolved phosphorus and nitrogen which is difficult to separate from the fouled water. The elements in question pollute to a high degree and are harmful to the environment; ample demonstration of such pollution, for example, would be the problem of eutrophic activity which causes the abnormal reproduction of algae, in lakes and along the coasts at river estuaries, as a result of river water being laden with industrial and urban waste. It has been recognized for some time that cellulose provides a source of the carbon which is essential to the growth of cellulolytic micro-organisms; the absorption of nitrogen and phosphorus is a feature of the growth of such micro-organisms. This natural process is already being exploited, for instance, in the production of re-utilizable 'bio-mass' energy sources from cellulose-rich refuse, the cellulose content of which must be removed. Such processes are disclosed in a number of patents —viz, U.S. Pat. No. 2,282,010, U.S. Pat. No. 4,461,708, DE No. 2227840 and U.S. Pat. No. 3,462,275. The cellulolytic process is also employed for stabilizing, and deodorizing and conditioning purified muds and fresh livestock sewage destined for agricultural use and for feed. Such a process is disclosed in FR No. 2260550.

The main object of the process disclosed is that of bringing about a drastic reduction in the phosphorus and nitrogen content of sewage.

The process also has the advantages of being highly economical and of providing by-products in the form of phosphorus- and nitrogen-rich fertilizer.

The aim and advantages thus stated are realized by the biological sewage-treatment processs disclosed, which is characterized in that it envisages contact brought about in aerobic conditions between the sewage and the cellulosic matter, for a given length of time, in the presence of cellulose-devouring heterotrophic micro-organisms.

Existing processes for the purification of sewage by biological means are classifiable under two basic types, according to whether the prevailing activity is aerobic or anaerobic. Such processes generally envisage a number of stages substantially comprising a first sedimentation stage to settle the more consistent solids, a second stage constituting treatment proper, and a third stage in which the muds are clarified and settled. Purified water is then drawn off whilst a proportion of the muds is recycled back to the second stage, the remainder being removed and utilized in the production of fertilizer. Processes of the above type may be continuous, or otherwise. The prior art further embraces a process for purification of sewage, disclosed in U.S. Pat. No. 4,039,438. Such a process employs cellulose in an anaerobic process whereby denitrification is implemented by elimination of the nitrogen content; however, no provision is made for the elimination of phosphorus, which is an element in sewage responsible for considerable pollution.

SUMMARY OF THE INVENTION

The process disclosed, which may be integrated into all the aerobic processes embraced by the prior art and mentioned thus far, exploits the natural existence in sewage of cellulose-devouring micro-organisms by introducing cellulosic matter in the raw state, added at any stage of the overall process in particles of any size whatever, with the end in view of bringing about contact in aerobic conditions, prolonged to a given degree, between the fouled water and the cellulosic matter.

More precisely, such matter may be added to advantage whether in the second or the third stage of the process. Generally speaking, it will be preferable to shred, or grind, or otherwise reduce the cellulosic matter in order that the preponderance of particles produced measures between 25 and 300 $\mu$m.

The presence of heterotrophic micro-organisms can be augmented to advantage by recycling a proportion of the muds settled in the third stage, in similar fashion to the conventional practice whereby augmentation of other bacteria is generally induced.

The process disclosed offers considerable advantages of feasibility and economy, as cellulosic materials are readily available and characterized by low cost; it may be safely asserted that at least 50% of solid refuse and agricultural by-products is cellulosic in composition.

Materials which lend themselves particularly well to the process would be straw, wood-shavings, sawdust, waste paper, etc.; these may be employed in their raw state, requiring no preliminary treatment beyond that of shredding, grinding or similar.

Cellulosic matter possesses a markedly low nitrogen-and-phosphorus content (quantifiable as 1% nitrogen and 0.1% phosphorus), and its introduction into the sewage triggers heterotrophic decomposition, brought about by the cellulose-devouring micro-organisms, which is accompanied by absorption of the nitrogen and phosphorus dissolved in the fouled water. Thus, one has the formation of nitrogen-and phoshporus-rich aggregates that in separating from the water, purify it of the two elements in question, and are precipitated during the clarification and settling stages in the form of muds. A proportion of such muds is recycled to assist the purification process whilst the remainder is drawn off for utilization ultimately, following suitable treatment, in the manufacture of fertilizer or other by-products.

It will be observed that the muds obtained with a process as disclosed are natural fertilizing agents, rich in nitrogen and phosphorus, and notwithstanding the as yet incomplete nature of experimental data regarding such muds, their employment in agriculture should nevertheless give more positive results than those produced by the muds currently precipitated. The overall quantity of nitrogen and phosphorus assimilated by the aggregates produced as a result of the aforedescribed decomposition of cellulosic matter will depend both on the quantity of matter introduced and on the duration of the process; clearly, the greater the quantity of cellulosic matter, and the longer the duration of the process, the greater will be the quantity of elements freed from the fouled water and assimilated during the process.

It will be equally clear that, for the purposes of practical application, both the quantity of cellulosic material and the duration of the process must be appropriately streamlined to render the process itself a viable proposition.

DESCRIPTION OF THE PREFERRED EMBODIMENTS

To this end, experimental tests have been conducted to assess the extent of the variation in absorption capacity of the cellulosic matter as related to the ratio between added cellulosic matter and the total solids in suspension; results show that the capacity diminishes with the increase in such a ratio.

Expressed differently, the greater the quantity of added cellulosic matter, the lesser the percentage efficiency of such matter. It follows, therefore, that the use of added cellulosic matter in massive quantities is of no advantage, since there is no appreciable percentage enhancement of the capacity to absorb nitrogen and phosphorus from the fouled water, and the process becomes difficult to run.

Experiments have shown that optimum results are obtained utilizing cellulosic matter added at a rate of between 40 and 60% of the total quantity of solids in suspension. Particularly satisfying results have been obtained adding cellulosic matter at a rate of 50% approximately.

Whatever the ultimate proportion, it will be clear that, having established the threshold at which the added quantity of cellulosic matter imposes technological limitations on the process (it will be remembered that no real quantitative limitation exists in economic terms, given the ultra-low cost of such materials), the greater the quantity of cellulosic matter employed within such a threshold, the greater will be the quantity of dissolved nitrogen and phosphorus removed from the fouled water.

Conversely, if one were to impose notably stringent parameters (such as would be necessary for drinking water), then it would be preferable, and in fact necessary, to increase the quantity of added celluloosic matter to the order of 200–300% of total solids in suspension, even at the expense of experiencing greater difficulty in running the operation.

As far as regards duration of the process, it will be observed that the capacity of cellulose-devouring heterotrophic micro-organisms to assimilate nitrogen and phosphorus registers an initial increase, before rising to a given maximum. The actual time required to reach such a maximum will depend upon the quantity and particle-size of the cellulosic matter, and will be determined ultimately by the type of installation and relative operating conditions; maximum capacity, as governed by these factors, might be reached in the space of a few hours, or following a number of days.

Such factors also provide the basis on which to calculate the duration of the process, or more exactly, the recycle and renewal intervals to be adopted for the cellulosic materials employed.

It will also be observed that the addition of cellulosic matter enhances the capacity of muds under toxic stress to recover their biological vitality. Experiment has also revealed that the addition of cellulosic matter during treatment by biological means not only favours the separation of a marked percentage of dissolved polluting elements (nitrogen and phosphorus) from the fouled water; it also permits of slowing up the process whereby such elements are released during endogenous breathing of the system, performs a buffer action of the pH value of the sewage, reduces flocculation in the aggregates, and inhibits decomposition of the muds, thereby enhancing the possibilities for utilization.

In special plant where nitrogen is eliminated partly by denitrification, the use of cellulosic matter as aforedescribed can replace currently-used sources of carbon (costly media such as methanol and ethanol) to significant advantage, and might be integrated into the aforementioned process as a preliminary step.

Besides being utilized in sewage treatment systems as described in the preamble, cellulosic materials of the type in question might be used in systems of any given type; likewise, provision might be made in existing installations for a specific stage in which to carry out cellulosic treatment of the type described.

We claim:

1. Process for the biological treatment and purification of sewage water containing phosphorus and nitrogen pollutants comprising the steps of
   contacting the sewage water with cellulose materials under aerobic conditions for a predetermined length of time, in the presence of cellulose-devouring heterotrophic micro-organisms, to trigger heterotrophic decomposition and absorption of nitrogen and phosphorus, and
   separating the sewage water from the cellulose materials and the micro-organisms, to obtain treated water depleted of said phosphorus and nitrogen pollutants.

2. Process as in claim 1, wherein the cellulose materials are shredded or ground or similarly reduced to a fine consistency.

3. Process as in claim 2, wherein the size of shredded, ground or similarly reduced particles of cellulose matter ranges between 25 and 300 $\mu$m.

4. Process as in claim 1 or 2, wherein the cellulose materials are utilized in their natural raw state.

5. Process as in claim 1, wherein the quantity of cellulose materials utilized represents approximately 40 to 60% of total solids suspended in the sewage.

6. Process as in claim 1, wherein the quantity of cellulose materials utilized is from 200 to 300% of total solids suspended in the sewage.

* * * * *